US010518513B2

(12) United States Patent
Oorui et al.

(10) Patent No.: US 10,518,513 B2
(45) Date of Patent: Dec. 31, 2019

(54) ULTRASONIC BONDING DEVICE AND ULTRASONIC BONDING METHOD

(71) Applicant: Nissan Motor Co., Ltd., Yokohama-shi, Kanagawa (JP)

(72) Inventors: Toshiaki Oorui, Kanagawa (JP); Takahiro Nakano, Kanagawa (JP); Shinji Fujisawa, Kanagawa (JP); Shiro Takaki, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 389 days.

(21) Appl. No.: 15/512,598

(22) PCT Filed: Oct. 15, 2014

(86) PCT No.: PCT/JP2014/077457
§ 371 (c)(1),
(2) Date: Mar. 20, 2017

(87) PCT Pub. No.: WO2016/059688
PCT Pub. Date: Apr. 21, 2016

(65) Prior Publication Data
US 2017/0305129 A1    Oct. 26, 2017

(51) Int. Cl.
*B32B 7/00*    (2019.01)
*B32B 15/00*   (2006.01)
*B32B 37/00*   (2006.01)
*B32B 38/00*   (2006.01)
*B32B 37/06*   (2006.01)
*B32B 7/12*    (2006.01)
(Continued)

(52) U.S. Cl.
CPC ............... *B32B 37/06* (2013.01); *B32B 7/12* (2013.01); *B32B 15/08* (2013.01); *B32B 37/12* (2013.01); *B32B 38/0004* (2013.01); *B32B 2457/10* (2013.01)

(58) Field of Classification Search
CPC .... B32B 7/00; B32B 7/10; B32B 7/12; B32B 15/00; B32B 15/08; B32B 37/00; B32B 37/06; B32B 37/10; B32B 37/12; B32B 38/00; B32B 38/0004
See application file for complete search history.

(56) References Cited

FOREIGN PATENT DOCUMENTS

EP    2 267 765 A1    12/2010
JP    S59-48815 U     3/1984
(Continued)

*Primary Examiner* — Jacob T Minskey
*Assistant Examiner* — Matthew Hoover
(74) *Attorney, Agent, or Firm* — Global IP Counselors, LLP

(57) ABSTRACT

An ultrasonic bonding device includes a processing member, a biasing member, a first moving unit and a second moving unit. The biasing member biases a pair of separators to the ultrasonic horn. A first moving unit separates the ultrasonic horn and the biasing member from each other with respect to a transport path of the separators. A second moving unit moves the separators and positions a bonding portion of the separators between the ultrasonic horn and the biasing member. The first moving unit has a coupling cam rotationally driven by a driving unit, a first connecting portion coupling the coupling cam and the processing member, and a second connecting portion coupling the coupling cam and the biasing member, and separating the processing member and the biasing member from each other with respect to the transport path by rotation of the coupling cam.

11 Claims, 9 Drawing Sheets

(51) Int. Cl.
*B32B 15/08* (2006.01)
*B32B 37/12* (2006.01)

(56) References Cited

FOREIGN PATENT DOCUMENTS

| | | |
|---|---|---|
| JP | 11-260853 A | 9/1999 |
| JP | 2002-160299 A | 6/2002 |
| JP | 2004-148373 A | 5/2004 |
| JP | 2011-206808 A | 10/2011 |
| JP | 2013-63521 A | 4/2013 |
| JP | 2014-117752 A | 6/2014 |

ULTRASONIC BONDING DEVICE AND ULTRASONIC BONDING METHOD

CROSS-REFERENCE TO RELATED APPLICATIONS

This application is a U.S. National stage application of International Application No. PCT/JP2014/077457, filed Oct. 15, 2014.

BACKGROUND

Field of the Invention

The present invention relates to an ultrasonic bonding device and an ultrasonic bonding method.

Background Information

Conventionally, there are ultrasonic bonding devices in which members to be bonded are sandwiched by a processing member that applies ultrasonic waves to the members to be bonded, and a biasing member that biases the members to be bonded to the processing member, while the members to be bonded are heated by the generated frictional heat and bonded to each other (see for example Japanese Laid Open Patent Application No. 2013-63521).

SUMMARY

However, in a configuration such as the above-described Japanese Laid Open Patent Application, when moving the members to be bonded between the processing member and the biasing member, the members to be bonded interfere with the processing member and the biasing member, and there is the possibility that the position of the ultrasonic bonding will be displaced, or that the ultrasonic bonding itself cannot be carried out. In particular, members to be bonded easily interfere with the biasing member, which has a fixed position.

In order to solve the problem described above, an object of the present invention is to provide an ultrasonic bonding device and an ultrasonic bonding method capable of bonding by moving members to be bonded along a transport path while avoiding physical interference.

The ultrasonic bonding device according to the present invention that achieves the object described above comprises a processing member, a biasing member, a first moving unit, and a second moving unit. The processing member bonds members to be bonded by applying ultrasonic waves thereto. The biasing member opposes the processing member across the members to be bonded, and biases the members to be bonded to the processing member. A first moving unit causes each of the processing member and the biasing member to separate from and approach each other, with respect to a transport path of the members to be bonded. The second moving unit moves the members to be bonded along the transport path in a state in which the processing member and the biasing member are separated from the transport path, and positions the bonding portions of the members to be bonded between the processing member and the biasing member. The first moving unit comprises a coupling cam that is rotationally driven by a driving unit, a first connecting portion that couples the coupling cam and the processing member, and a second connecting portion that couples the coupling cam and the biasing member, and causes the processing member and the biasing member to separate from and approach each other by the rotational driving of the coupling cam.

The ultrasonic bonding method according to the present invention that achieves the object described above comprises a moving step and a bonding step. In the moving step, the bonding portion of the members to be bonded is moved between the member to be processed and the biasing member, in a state in which the processing member that applies ultrasonic waves to the members to be bonded, and the biasing member that biases the processing member via the members to be bonded, are each separated from the transport path of the members to be bonded. In the bonding step, the members to be bonded are bonded while being sandwiched by the processing member and the biasing member.

DETAILED DESCRIPTION OF THE EMBODIMENTS

Figure 1:
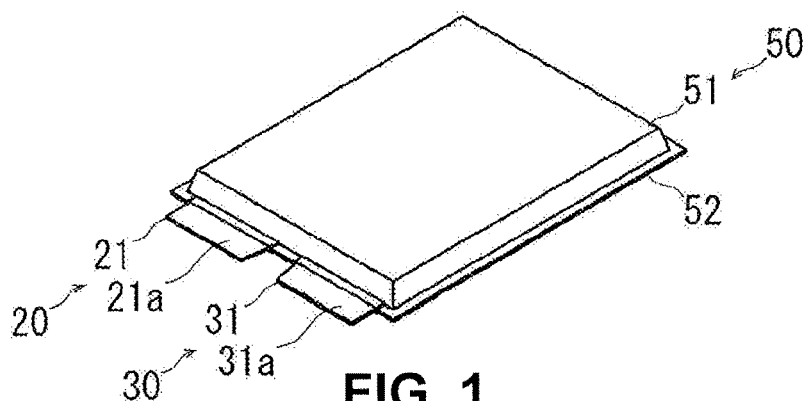
FIG. 1 is a perspective view illustrating a lithium ion secondary battery configured by using the members to be bonded (separator) according to a first embodiment.

The first and the second embodiments according to the present invention will be described below, with reference to the appended drawings. In the explanations of the drawings, the same elements are given the same codes, and overlapping explanations are omitted. The sizes and ratios of the members in the drawing are exaggerated for convenience of explanation, and may be different from the actual sizes and ratios. In all of the drawings from FIGS. 1 to 10B, the orientation is shown using arrows represented by X, Y, and Z. The direction of the arrow indicated by X indicates the final transport direction X of the separators 40, positive electrode 20, etc. The direction of the arrow indicated by Y indicates the intersecting direction Y that intersects the transport direction X. The direction of the arrow indicated by Z indicates the lamination direction Z of the separators 40 and the positive electrode 20.

First Embodiment

Figure 2:
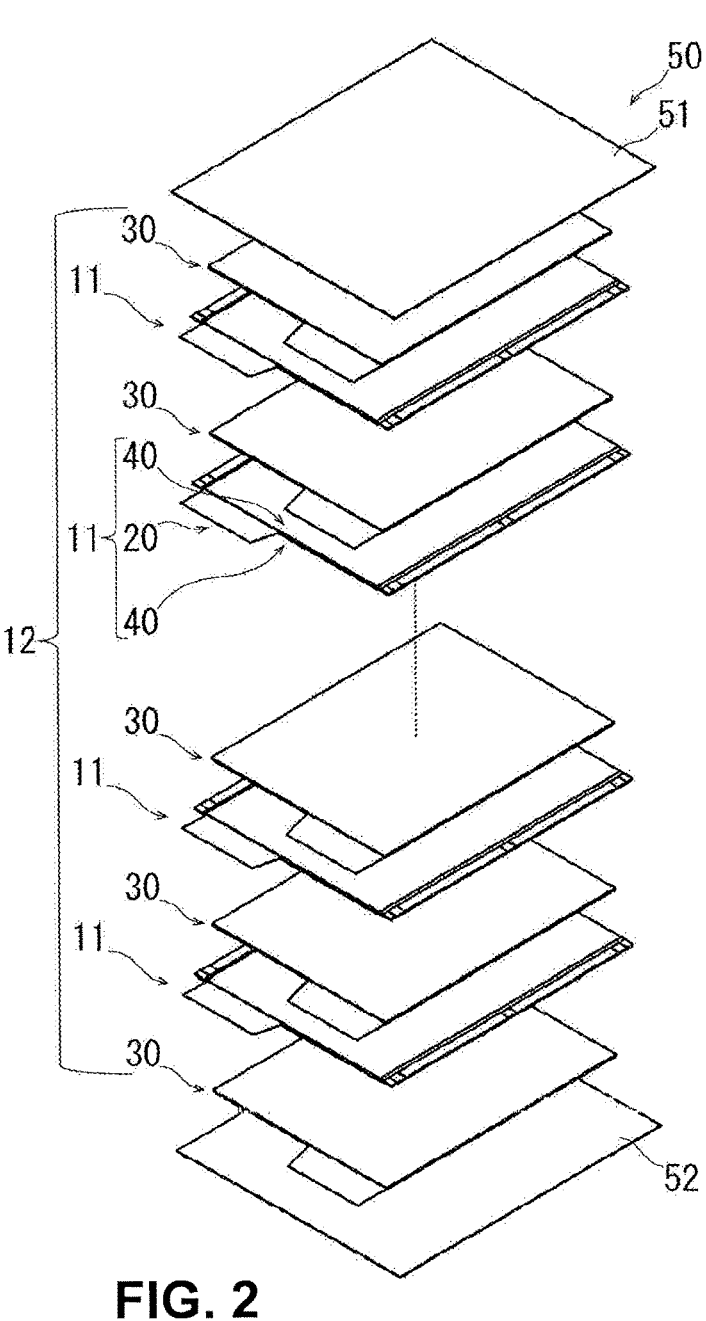
FIG. 2 is an exploded perspective view illustrating the lithium ion secondary battery of FIG. 1 separated into component members.
Figure 3:
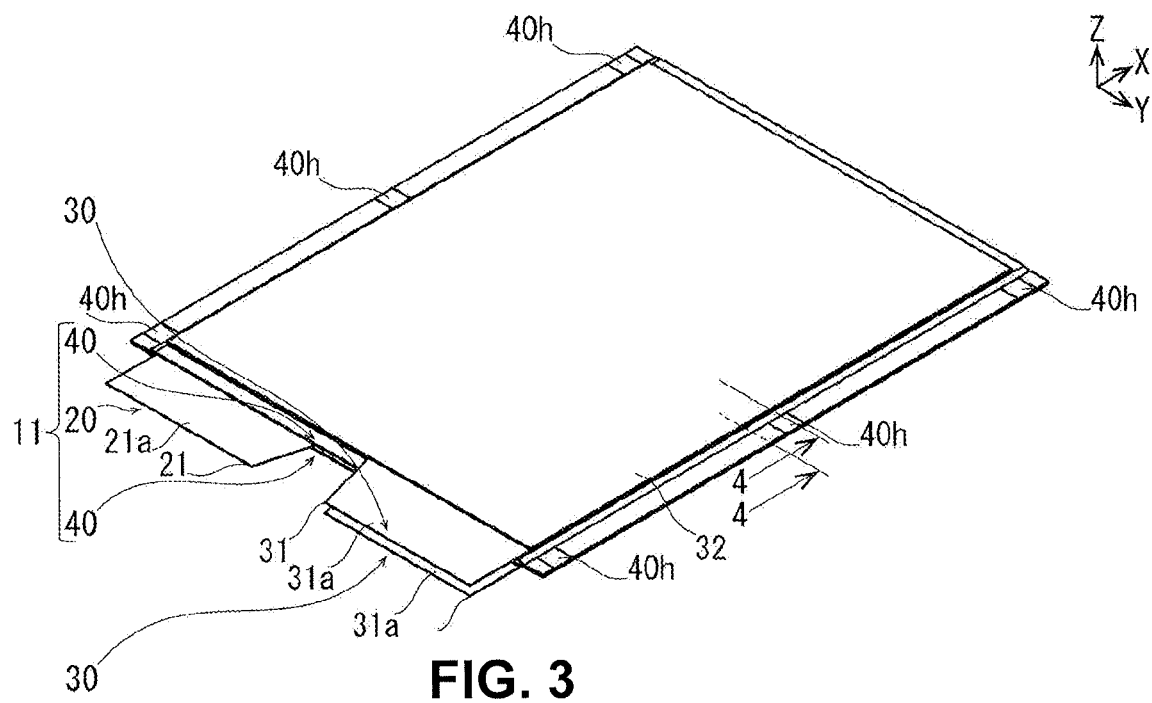
FIG. 3 is a perspective view illustrating a state in which negative electrodes are respectively laminated on both sides of the bagged electrode of FIG. 1.
Figure 4:
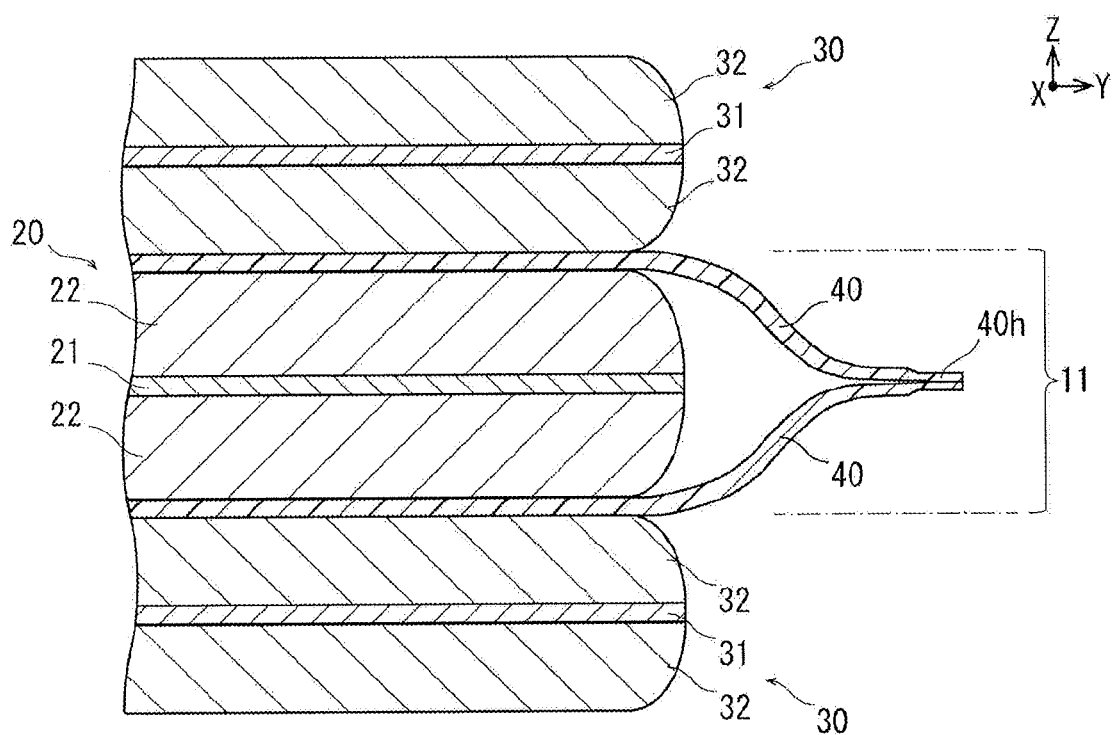
FIG. 4 is a partial cross-sectional view illustrating the configuration of FIG. 3 taken along the 4-4 line shown in FIG. 3.

The members to be bonded, which are bonded by the ultrasonic bonding device 100 (separators 40) are illustrated particularly in FIG. 2-FIG. 4, from among FIGS. 1 to 4. The members to be bonded (separators 40) are used, for example, in a bagged electrode 11 that configures the lithium ion secondary battery 1.

The lithium ion secondary battery 1 is configured by sealing power generating elements 12, which carry out charge/discharge, with an exterior material 50. A power generating element 12 is configured by alternately stacking negative electrodes 30 and bagged electrodes 11, which are formed by bonding after sandwiching a positive electrode 20 with a pair of separators 40. Even if the lithium ion secondary battery 1 is oscillated or receives an impact, short circuiting is prevented between the positive electrode 20 and the negative electrode 30, which are adjacent to each other via separators 40, by suppressing the movement of the positive electrode 20 with bonding portions 40h formed at both sides of a pair of separators 40. Details of the lithium ion secondary battery 1 using the members to be bonded (separators 40) will be described later.

The ultrasonic bonding device 100 is illustrated in FIGS. 5-9. The ultrasonic bonding device 100 bonds a pair of members to be bonded (separators 40) to each other.

The ultrasonic bonding device 100 bonds the separators 40 to each other. The ultrasonic bonding device 100 comprises an electrode conveyance unit 110 for transporting electrodes (positive electrode 20 or negative electrode 30), a first separator conveyance unit 120 for transporting a separator 40 that is laminated on one surface of the positive electrode 20, and a second separator conveyance unit 130 for transporting the separators 40 that are laminated on the other surface of the positive electrode 20. In addition, the ultrasonic bonding device 100 comprises a separator bonding unit 140 that bonds a pair of separators 40 to each other, a bagged electrode conveyance unit 160 that transports a bagged electrode 11, and a control unit 170 that controls the respective operation of each component member. Details of the ultrasonic bonding device 100 will be described later.

First, the members to be bonded (separators 40) that are bonded to each other by the ultrasonic bonding device 100 will be described based on the configuration of the lithium ion secondary battery 1 using the members to be bonded (separators 40), with reference to FIGS. 1 to 4.

FIG. 1 is a perspective view illustrating the lithium ion secondary battery 1 configured by using the members to be bonded (separators 40). FIG. 2 is an exploded perspective view illustrating the lithium ion secondary battery 1 of FIG. 1 separated into component members. FIG. 3 is a perspective view illustrating a state in which negative electrodes 30 are respectively laminated on both sides of the bagged electrode 11 of FIG. 1. FIG. 4 is a partial cross-sectional view illustrating the configuration of FIG. 3 taken along line 4-4 in FIG. 3.

The positive electrode 20 corresponds to an electrode, and is formed by binding positive electrode active materials on both surfaces of a positive electrode current collector 21, which is a conductive body. A positive electrode terminal 21a that takes out power is formed extending from a portion of one end of the positive electrode current collector 21. The positive electrode terminals 21a of a plurality of laminated positive electrodes 20 are fixed to each other by welding or adhesion.

Examples of materials used for the positive electrode current collector 21 of the positive electrode 20 include aluminum expanded metal, aluminum mesh, and aluminum punched metal. Examples of materials used for the positive electrode active material of the positive electrode 20 include various oxides (lithium manganese oxides such as $LiMn_2O_4$, manganese dioxide, lithium nickel oxides such as $LiNiO_2$, lithium cobalt oxides such as $LiCoO_2$, lithium-containing nickel cobalt oxides, or amorphous vanadium pentoxide containing lithium) and chalcogen compounds (titanium disulfide, molybdenum disulphide).

The negative electrode 30 corresponds to an electrode with a different polarity than the positive electrode 20, and is formed by binding negative electrode active material 32 on both surfaces of a negative electrode current collector 31, which is a conductive body. A negative electrode terminal 31a is formed extending from a portion of one end of the negative electrode current collector 31 so as to not overlap with the positive electrode terminal 21a formed on the positive electrode 20. The longitudinal length of the negative electrode 30 is longer than the longitudinal length of the positive electrode 20. The lateral width of the negative electrode 30 is the same as the lateral width of the positive electrode 20. The negative electrode terminals 31a of a plurality of laminated negative electrodes 30 are fixed to each other by welding or adhesion.

Examples of materials used for the negative electrode current collector 31 of the negative electrode 30 include copper expanded metal, copper mesh, and copper punched metal. A carbon material that absorbs and releases lithium ions is used as a material for the negative electrode active material 32 of the negative electrode 30. Examples of such carbon material used include natural graphite, artificial graphite, carbon black, activated carbon, carbon fiber, coke, or carbon synthesized by thermal treating an organic precursor (phenol resins, polyacrylonitrile, or cellulose) in an inert atmosphere.

The separator 40 is provided between the positive electrode 20 and the negative electrode 30, and electrically isolates the positive electrode 20 and the negative electrode 30. The separator 40 holds an electrolytic solution between the positive electrode 20 and the negative electrode 30 to ensure conductance of lithium ions. The separator 40 is made of, for example, polypropylene, and is formed into a thin plate. The longitudinal length of the separator 40 is longer than the longitudinal length of the negative electrode 30 excluding the negative electrode terminal 31a portion. The separator 40 is impregnated with a nonaqueous electrolyte solution prepared by dissolving electrolytes in a nonaqueous solvent. Polymers are contained in order to retain the nonaqueous electrolyte solution in the separator 40.

A pair of separators 40 are laminated so as to sandwich the two surfaces of a positive electrode 20, then bagged to configure a bagged electrode 11. For example, a total of three bonding portions 40h are each formed at the two ends and the central portion on both sides of the pair of separators 40 along the longitudinal direction. Even if the lithium ion secondary battery 1 is oscillated or receives an impact, the movement of the positive electrode 20 in the bagged electrode 11 can be suppressed, with bonding portions 40h formed at both ends of the separators 40 in the longitudinal direction. That is, short circuiting is prevented between the positive electrode 20 and the negative electrode 30 which are adjacent to each other via the separator 40. Therefore, the lithium ion secondary battery 1 is able to maintain the desired electrical characteristics.

The exterior material 50 is configured, for example, from laminated sheets 51 and 52 which comprise metal plates inside, and coats a power generating element 12 from both sides to form a seal. When sealing the power generating element 12 with the laminated sheets 51 and 52, a portion of the periphery of the laminated sheets 51 and 52 is opened while the other peripheral portions are sealed by thermal welding or the like. An electrolytic solution is injected from the opened portions of the laminated sheets 51 and 52 to impregnate the separators 40, etc., with the electrolytic solution. Air is removed by reducing the interior pressure from the opened portions of the laminated sheets 51 and 52, and the opened portions are also heat-sealed to form a complete seal.

The laminated sheets 51 and 52 of the exterior material 50 form, for example, a three-layer structure by each laminating three types of materials. The first layer corresponds to a thermal adhesive resin; for example, polyethylene (PE), ionomers, or ethylene vinyl acetate (EVA) is used. The material of the first layer is placed adjacent to the negative electrode 30. The second layer corresponds to a metal formed into a foil; for example, an Al foil or a Ni foil is used. The third layer corresponds to a resin film, and, for example, rigid polyethylene terephthalate (PET) or nylon is used therefor.

Next, the configuration of the ultrasonic bonding method 100 (electrode conveyance unit 110, first separator conveyance unit 120, second separator conveyance unit 130, separator bonding unit 140, separate/approach unit 150, bagged electrode conveyance unit 160, and control unit 170) that embodies the method of bonding members to be bonded (separators 40) will be described in order, with reference to FIGS. 5 to 8B.

Figure 5:
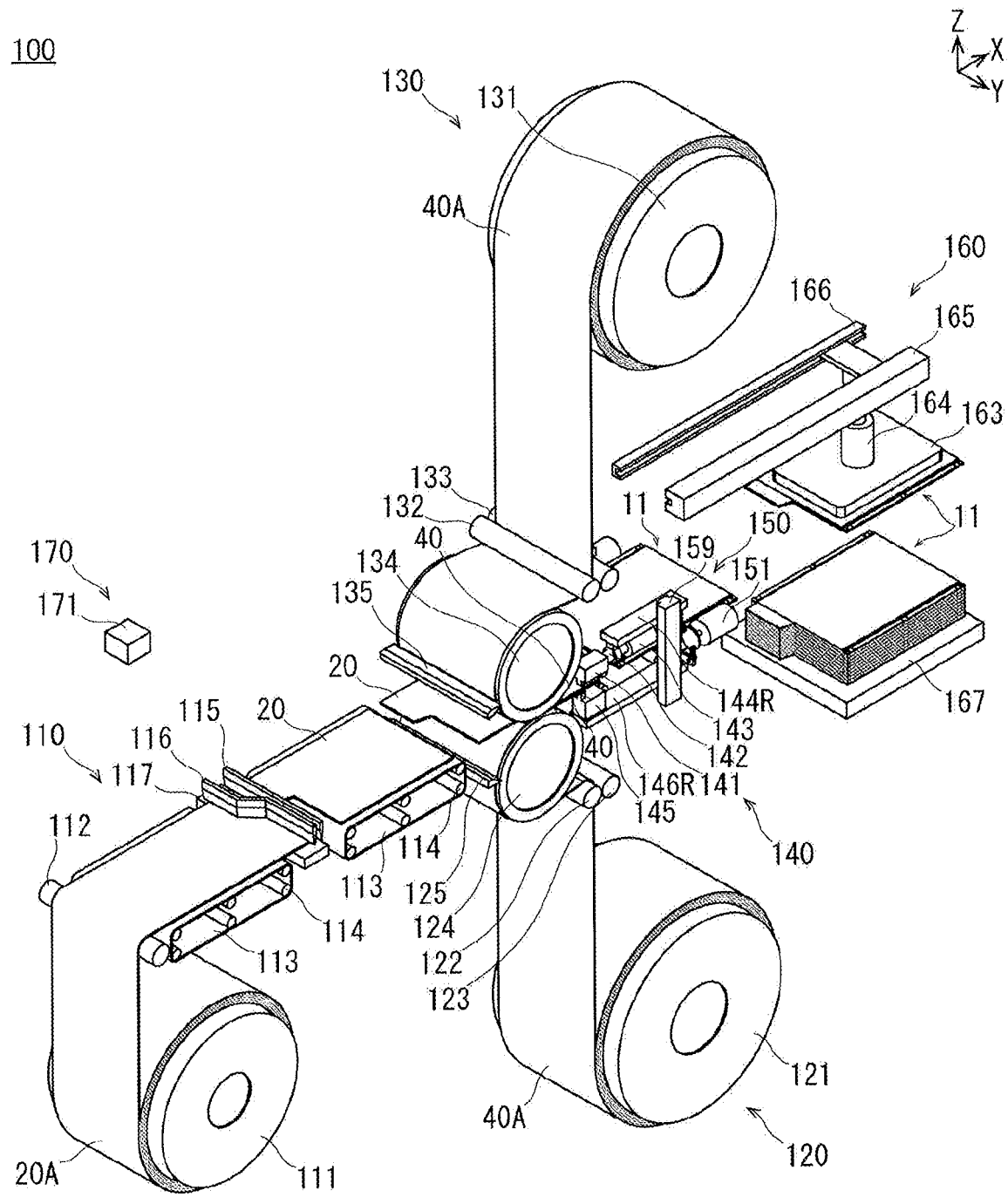
FIG. 5 is a perspective view illustrating the ultrasonic bonding device according to the first embodiment.
Figure 6A:
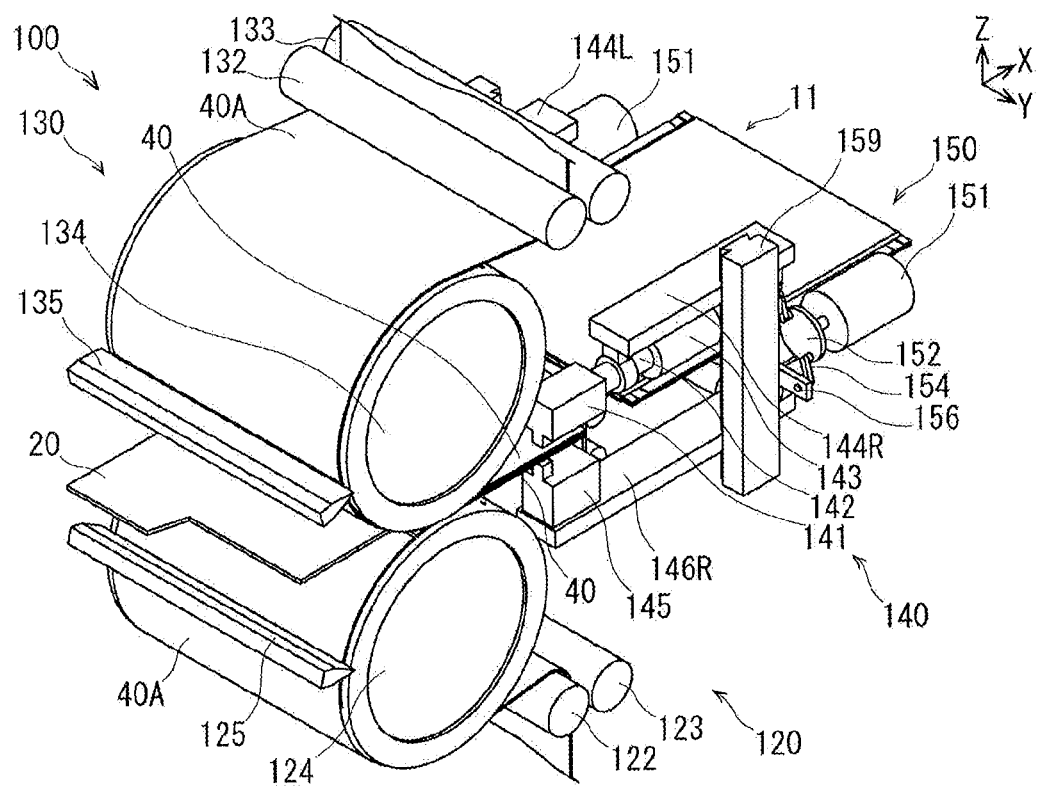
FIGS. 6A and 6B are perspective views illustrating the principle parts of the ultrasonic bonding device of FIG. 5.
Figure 6B:
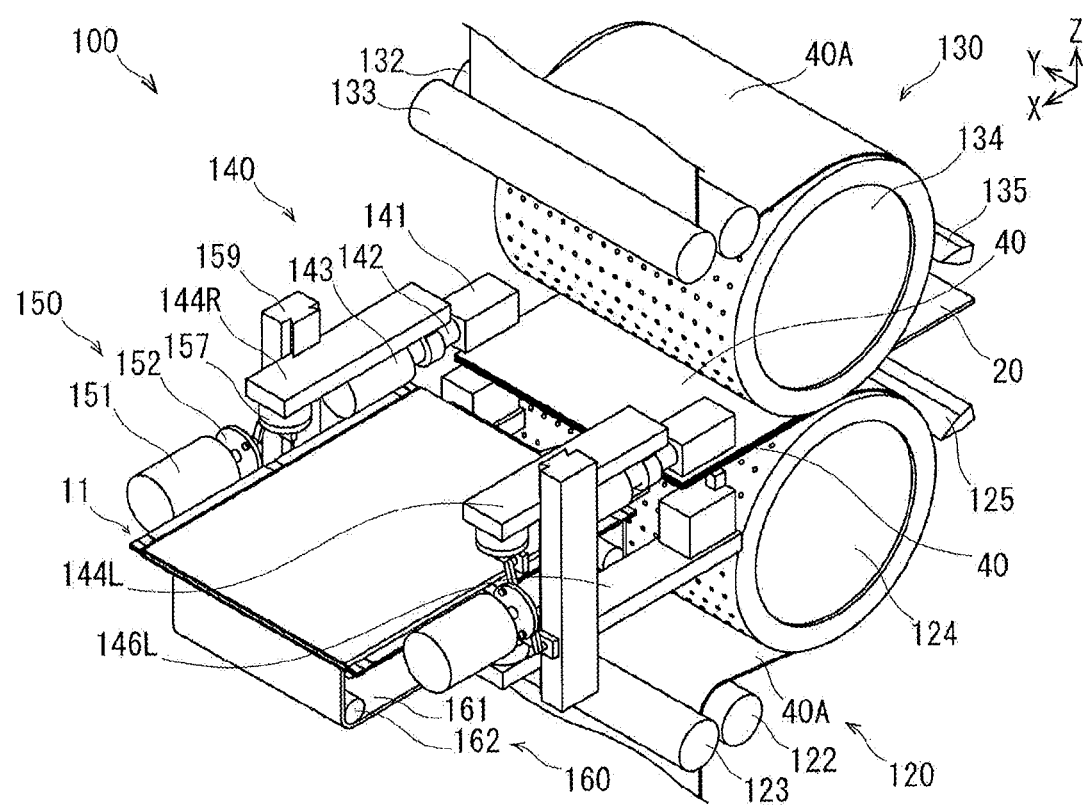
Figure 7:
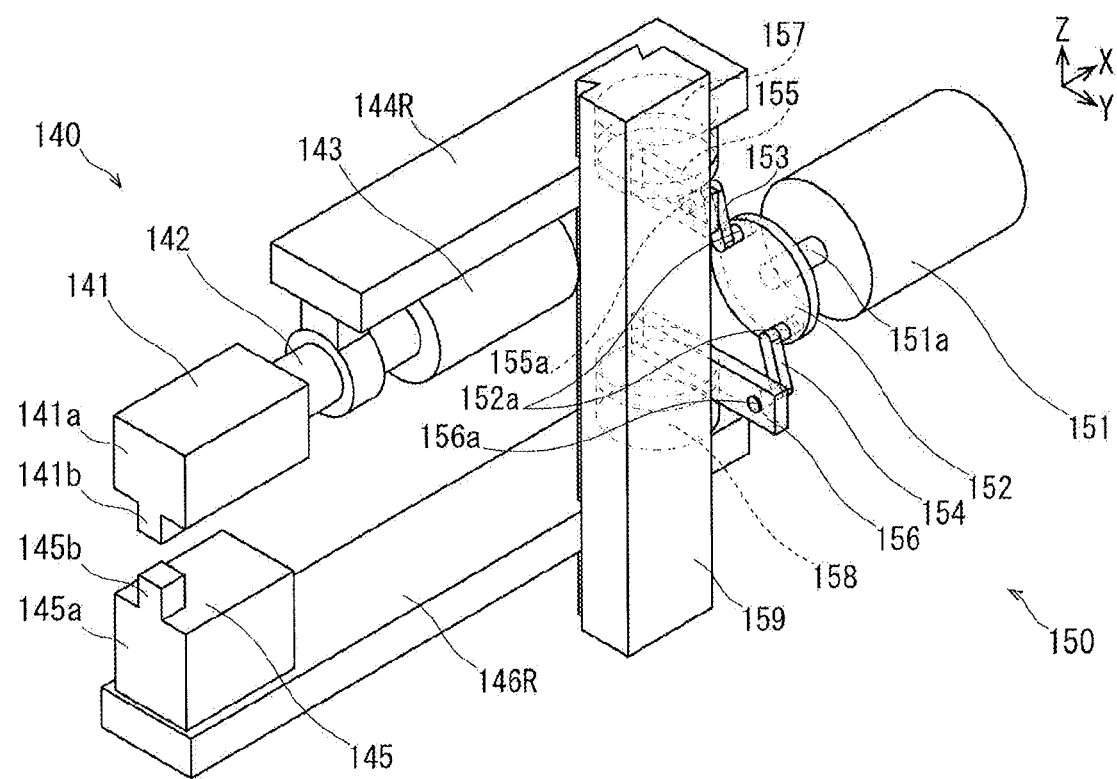
FIG. 7 is a perspective view illustrating the separator bonding unit and the separate/approach unit of the ultrasonic bonding device of FIG. 5.

FIG. 5 is a perspective view illustrating the ultrasonic bonding device 100. FIGS. 6A and 6B are perspective views illustrating the principle parts of the ultrasonic bonding device 100 of FIG. 5. FIG. 7 is a perspective view illustrating the separator bonding unit 140 and the separate/approach unit 150 of the ultrasonic bonding device of FIG. 5.

Figure 8A:
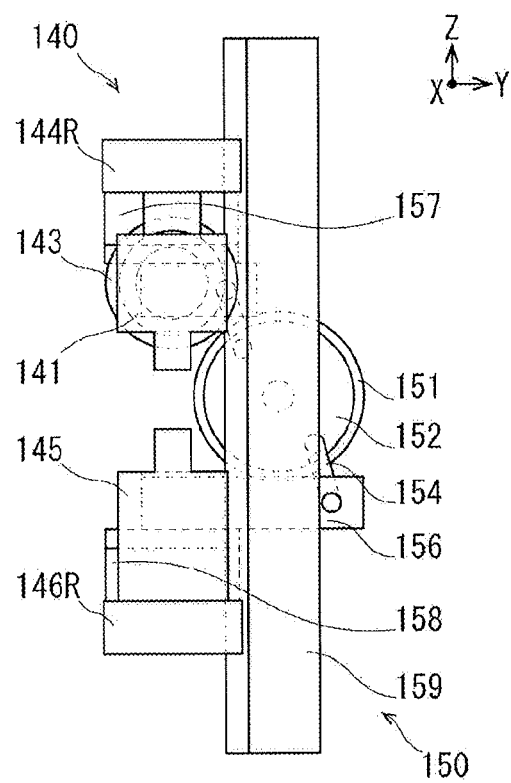
FIGS. 8A and 8B are side views illustrating the separator bonding unit and the separate/approach unit of the ultrasonic bonding device of FIG. 7.
Figure 8B:
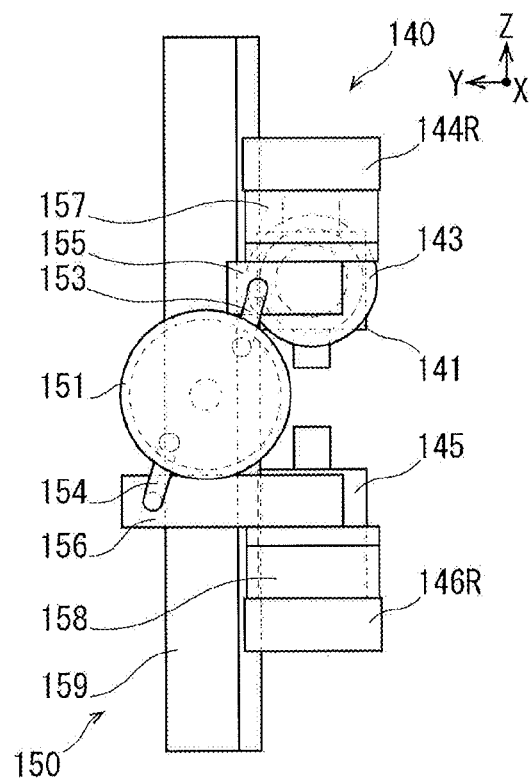

FIG. 7 is illustrated by transmitting a portion of the component members of the ultrasonic bonding device 100. FIGS. 8A and 8B are side views illustrating the separator bonding unit 140 and the separate/approach unit 150 of the ultrasonic bonding device 100 of FIG. 5. FIGS. 8A and 8B are illustrated by transmitting a portion of the component members of the separator bonding unit 140 and the separate/approach unit 150. FIG. 8A illustrates the separator bonding unit 140 and the separate/approach unit 150 from the upstream side (forward in the drawing) toward the downstream side (rearward in the drawing) of the transport direction X. FIG. 8B illustrates the separator bonding unit 140 and the separate/approach unit 150 from the downstream side (forward in the drawing) toward the upstream side (rearward in the drawing) of the transport direction X.

The electrode conveyance unit 110, illustrated in FIG. 5, cuts out and transports a positive electrode 20 from an elongated positive electrode substrate 20A.

An electrode feed roller 111 of the electrode conveyance unit 110 holds the positive electrode substrate 20A. The electrode feed roller 111 has a cylindrical shape, and the elongated positive electrode substrate 20A is wound thereon. The conveyance roller 112 guides the positive electrode substrate 20A to the conveyor belt 113. The conveyance roller 112 has an elongated cylindrical shape, and guides the positive electrode substrate 20A wound on the electrode feed roller 111 to the conveyor belt 113 while applying a constant tension thereon. The conveyor belt 113 is for transporting the positive electrode substrate 20A. The conveyor belt 113 comprises an endless belt provided with a plurality of suction openings on the outer perimeter surface, and conveys the positive electrode substrate 20A under a suctioned state along the conveyance direction X. The width of the conveyor belt 113 along the intersecting direction Y which intersects the transport direction X is greater than the width of the positive electrode substrate 20A. The rotating roller 114 is for rotating the conveyor belt 113. A plurality of rotating rollers 114 are arranged on the inner perimeter surface of the conveyor belt 113 along the intersecting direction Y, to rotate the conveyor belt 113. Of the plurality of rotating rollers 114, one is a drive roller provided with power, and the others are driven rollers which are driven by the drive roller. The conveyance roller 112 and the electrode feed roller 111 are rotated by being driven by the rotation of the conveyor belt 113.

The cutting blades 115 and 116 of the electrode conveyance unit 110 are for cutting the positive electrode substrate 20A to form positive electrodes 20. The cutting blades 115 and 116 are arranged so as to be adjacent to each other along the intersecting direction Y, and cut the positive electrode substrate 20A into a predetermined shape to form positive electrodes 20. The cutting blade 115 is provided with a sharp linear blade at the distal end and cuts one end of the positive electrode substrate 20A in a linear shape along the intersecting direction Y. The cutting blade 116 is provided with a sharp blade, a portion of which is bent and formed in a stepped manner, at the distal end, and cuts the other end of the positive electrode substrate 20A immediately after the one end thereof is cut, in accordance with the shape of the positive electrode terminal 21a. A receptacle 117 is for receiving the cutting blade 115 and the cutting blade 116, which cut the positive electrode substrate 20A. The receptacle 117 is disposed opposing the cutting blade 115 and cutting blade 116 via the positive electrode substrate 20A to be transported. The electrode conveyance unit 110 conveys the positive electrode 20 cut out from the positive electrode substrate 20A so as to pass between the first separator conveyance unit 120 and the second separator conveyance unit 130.

The first separator conveyance unit 120 cuts out a separator 40 for laminating on one surface of the positive electrode 20 (the back surface side, downward along the lamination direction Z in FIG. 5) from the separator substrate 40A, and transports the separator to the separator bonding unit 140, as illustrated in FIGS. 5, 6A and 6B.

The first separator conveyance unit 120 configures the second moving unit. The first separator conveyance unit 120 unit, along with the second separator conveyance unit 130, moves a pair of separators 40 along a transport path K, in a state in which an ultrasonic horn 141 and an anvil 145 are separated from the transport path K, and positions the bonding portion 40h of the pair of separators 40 between the ultrasonic horn 141 and the anvil 145.

The first separator conveyance unit 120 embodies a portion of the moving step. In the moving step, the first separator conveyance unit 120 along with the second separator conveyance unit 130, move the bonding portion 40h of the pair of separators 40 between the ultrasonic horn 141 and the anvil 145, in a state in which the ultrasonic horn 141 and the anvil 145 are respectively separated from each other, from the transport path K of the pair of separators 40.

The first separator conveyance unit 120 is disposed on the downstream side of the electrode conveyance unit 110 in the transport direction X and downward along the lamination direction Z in FIGS. 5, 6A and 6B. The first separator feed roller 121 is for holding a separator substrate 40A. The first separator feed roller 121 has a cylindrical shape and an elongated separator substrate 40A is wound thereon. A first pressure roller 122 and a first nip roller 123 are for guiding the separator substrate 40A to a first conveyance drum 124, while applying a constant tension thereon. The first pressure roller 122 and the first nip roller 123 are arranged facing each other, and each have an elongated cylindrical shape.

The first conveyance drum 124 is for transporting the separator substrate 40A to the separator bonding unit 140. The first conveyance drum 124 causes a separator 40 that has been cut into a rectangular shape to approach and be laminated on one surface (the back surface side, downward along the lamination direction Z in FIG. 5) of a positive electrode 20 that has been transported from the electrode conveyance unit 110. The separator 40 is opposed to one surface of the positive electrode 20. The first conveyance drum 124 has a cylindrical shape, and is provided with a plurality of suction openings on the outer perimeter surface thereof. When the first conveyance drum 124 of the first separator conveyance unit 120 is rotated, the first separator feed roller 121 is driven and rotated, in addition to the first pressure roller 122 and the first nip roller 123. The first cutting blade 125 is for cutting the elongated separator substrate 40A to form separators 40. A first cutting blade 125 is provided with a sharp linear blade at the distal end, arranged along the intersecting direction Y which intersects the transport direction X, and cuts the elongated separator substrate 40A which is being suctioned by the first conveyance drum 124 at a constant width.

The second separator conveyance unit 130 cuts out a separator 40 for laminating on the other surface that opposes the one surface of the positive electrode 20 (the front surface side, upward along the lamination direction Z in FIG. 5) from the separator substrate 40A, and transports the separator to the separator bonding unit 140, as illustrated in FIGS. 5, 6A and 6B. The second separator conveyance unit 130 configures the second moving unit, in the same manner as the first separator conveyance unit 120.

The second separator conveyance unit 130 is disposed on the downstream side of the electrode conveyance unit 110 in the transport direction X and upward along the lamination direction Z in FIGS. 5, 6A and 6B. That is, the second separator conveyance unit 130 is disposed opposing the first separator conveyance unit 120 along the lamination direction Z such that the opposed faces are oriented in the same direction. The second separator feed roller 131 of the second separator conveyance unit 130, the second pressure roller 132, the second nip roller 133, the second conveyance drum 134, and the second cutting blade 135 are configured in the same manner as the first separator feed roller 121 of the first separator conveyance unit 120, the first pressure roller 122, the first nip roller 123, the first conveyance drum 124, and the first cutting blade 125.

The separator bonding unit 140 bonds a pair of separators 40 to each other, as illustrated in FIGS. 5 to 8B.

The separator bonding unit 140 embodies the bonding step of the bonding method. The separator bonding unit 140 bonds the pair of separators 40 while sandwiching the same between the ultrasonic horn 141 and the anvil 145.

The separator bonding unit 140 is disposed on the downstream side of the first separator conveyance unit 120 and the second separator conveyance unit 130 in the transport direction X, one set each at the two ends along the transport direction X. In the separator bonding unit 140, the ultrasonic horn 141, the booster 142, the oscillator 143, and the first holding member 144, are disposed above the pair of separators 40 in FIGS. 6A and 6B. On the other hand, the anvil 145 and the second holding member 146 are disposed below the pair of separators 40 in FIGS. 6A and 6B.

The ultrasonic horn 141 of the separator bonding unit 140 corresponds to the processing member, and is for applying ultrasonic waves to the separators 40 while applying pressure thereto, to heat the separator 40 by frictional heat. The ultrasonic horn 141 is made of metal, integrally forming a rectangular main body portion 141a and a protrusion 141b formed protruding from a corner of the main body portion 141a. The protrusion 141b of the ultrasonic horn 141 abuts with the separator 40. The booster 142 is for amplifying the ultrasonic waves that are emitted from the oscillator 143 while propagating the same to the ultrasonic horn 141. The booster 142 is disposed between the ultrasonic horn 141 and the oscillator 143. The booster 142 is made of metal and formed in a cylindrical shape.

The oscillator 143 is for generating ultrasonic waves. One end of the oscillator 143 is fastened to the booster 142. The oscillator 143 generates a vibration corresponding to the frequency of the ultrasonic waves by electric power that is supplied from the outside. The first holding member 144 is for holding the ultrasonic horn 141. One end of the holding member 144 is formed in an annular shape, and the booster 142 that is connected to the ultrasonic horn 141 is inserted therethrough. The ultrasonic horn 141 is moved along the lamination direction via the first holding member 144 by the separate/approach unit 150 described later and presses the pair of separators 40. That is, the separate/approach unit 150 plays a portion of the function of the separator bonding unit 140 (operation relating to the movement of the ultrasonic horn 141). For example, with respect to FIG. 6A as a reference, the first holding member 144 illustrated on the right side of the drawing is the first holding member 144R and that illustrated on the left side is the first holding member 144L.

The anvil 145 of the separator bonding unit 140 corresponds to a biasing member, and biases the pair of separators 40 to the ultrasonic horn 141. The anvil 145 is made of metal, integrally forming a rectangular main body portion 145a and a protrusion 145b formed protruding from one end of the main body portion 145a. The protrusion 145b of the anvil 145 is disposed facing the protrusion 141b of the ultrasonic horn 141 along the lamination direction Z. The second holding member 146 is for holding the anvil 145. The anvil 145 is placed on the second holding member 146 and joined thereto. For example, with respect to FIG. 6A as a reference, the second holding member 146 illustrated on the right side of the drawing is the second holding member 146R and that illustrated on the left side is the second holding member 146L. The anvil 145 is moved along the lamination direction via the second holding member 146 by the separate/approach unit 150 described later and biases the pair of separators 40 to the ultrasonic horn 141. That is, the separate/approach unit 150 plays a portion of the function of the separator bonding unit 140 (operation relating to the movement of the anvil 145).

Here, the separator bonding unit 140 may be configured to move toward the downstream side in the transport direction X so as to follow the movement of the first separator conveyance unit 120 and the second separator conveyance unit 130, while the ultrasonic horn 141 and the anvil 145 are sandwiching and bonding the pair of separators 40. In this case, the separator bonding unit 140 returns toward the upstream side in the transport direction X at high speed along with the separate/approach unit 150, after the bonding of the pair of separators 40 is completed. If configured in this manner, the separator bonding unit 140 is capable of bonding a pair of separators 40 without temporarily stopping the rotations of the first conveyance drum 124 and the second conveyance drum 134, etc.

The separate/approach unit 150 at least respectively separates the ultrasonic horn 141 and the anvil 145 from each other, from the transport path K of the pair of separators 40, as illustrated in FIGS. 5 to 8B.

The separate/approach unit 150 configures the first moving unit. The first moving unit comprises a coupling cam that is rotationally driven by a driving unit, a first connecting portion that couples the coupling cam and the processing member, and a second connecting portion that couples the coupling cam and the biasing member, and causes the processing member and the biasing member to separate from and approach each other with respect to the transport path by the rotation of the coupling cam. The separate/approach unit 150 embodies a portion of the moving step. In the moving step according to the separate/approach unit 150, at least the ultrasonic horn 141 that applies an ultrasonic wave to the pair of separators 40 and the anvil 145 that is biased to the ultrasonic horn 141 via the pair of separators 40 are separated from each other, from the transport path K of the pair of separators 40.

The separate/approach unit 150 is disposed coupled to the separator bonding unit 140, one set each of which is arranged on the two sides along the transport direction X.

The servo motor 151 is included in the rotation unit, and is for causing the ultrasonic horn 141 and the anvil 145 to separate from, or approach each other, via the other component members. The coupling cam 152 is included in the rotation unit, and is for transmitting the rotation of the servo motor 151 to the first coupling pin 153 and the second coupling pin 154. The coupling cam 152 is connected to a rotational shaft 151a of the servo motor 151. The coupling cam 152 is formed in a disk shape, and two through-holes 152a extend therethrough, opposing each other on a concentric circle that is eccentric from the rotational axis thereof. The first coupling pin 153 and the second coupling pin 154 are rotatably inserted in the pair of through-holes 152a.

The first coupling pin 153 is included in a first supporting part, and is for linearly transmitting the rotational movement of the coupling cam 152, with respect to a first connecting plate 155. The first coupling pin 153 is formed having a main body portion formed in a rod shape, and cylindrical protrusions that protrude in opposite directions, from one end and the other end of the main body portion. One end of the first coupling pin 153 is inserted in one of the two through-holes 152a opened in the coupling cam 152, and the other end is inserted in a through-hole 155a in the first connecting plate 155. The second coupling pin 154 is included in a second supporting part, and is for linearly transmitting the rotational movement of the coupling cam 152, with respect to a second connecting plate 156. The second coupling pin 154 is formed having the same shape as the first coupling pin 153. One end of the second coupling pin 154 is inserted in one of the two through-holes 152a opened in the coupling cam 152, and the other end is inserted in a through-hole 156a of the second connecting plate 156.

The first connecting plate 155 is included in the first supporting part, and is for transmitting the movement of the first coupling pin 153 to a first cylinder 157. The first connecting plate 155 is formed in a plate shape, and a through-hole 155a is opened in one end thereof. The first connecting plate 155 is connected to the lower surface of the first cylinder 157 along the lamination direction Z, and the other end of the first coupling pin 153 is inserted in the through-hole 155a thereof. The second connecting plate 156 is included in the second supporting part, and is for transmitting the movement of the second coupling pin 154 to a second cylinder 158. The second connecting plate 156 is formed in a plate shape, and a through-hole 156a is opened to one end thereof. The second connecting plate 156 is connected to the upper surface of the second cylinder 158 along the lamination direction Z, and the other end of the second coupling pin 154 is inserted in the through-hole 156a thereof.

The first cylinder 157 corresponds to the first pressing member, and is telescopically configured along a direction that intersects with the transport path K to press the ultrasonic horn 141 to the pair of separators 40. The first cylinder 157 is expanded and contracted, for example, by a medium that is supplied from the outside via a regulator. The first connecting plate 155 is connected to the lower surface of the first cylinder 157 so as to be suspended along the lamination direction Z, and one end of the first holding member 144R or 144L of the separator bonding unit 140 is connected so as to be placed on the upper surface along the lamination direction Z. The second cylinder 158 corresponds to the second pressing member, and is telescopically configured along a direction that intersects with the transport path K to press the anvil 145 to the pair of separators 40. The second cylinder 158 is configured in the same manner as the first cylinder 157. One end of the second holding member 146R or 146L of the separator bonding unit 140 is connected to the lower surface of the second cylinder 158 so as to be suspended along the lamination direction Z, and the first connecting plate 155 is connected so as to be placed on the upper surface along the lamination direction Z.

A reference rail 159 is for guiding such that the first holding member 144R or 144L, and the second holding member 146R or 146L, are respectively moved along the lamination direction Z. The reference rail 159 is formed in a prismatic shape that is upright along the lamination direction Z. The reference rail 159 is respectively engaged with a trapezoidal groove that is formed to the first holding member 144R or 144L, and a trapezoidal groove that is formed to the second holding member 146R or 146L.

In the separate/approach unit 150, when the servo motor 151 is rotated in a clockwise direction, in an orientation from the upstream to the downstream along the transport direction X, the coupling cam 152 is rotated in the clockwise direction, as illustrated in FIG. 8A. Therefore, the first coupling pin 153 is raised along the lamination direction Z. As a result, the first connecting plate 155, the first cylinder 157, and the first holding member 144 of the separator bonding unit 140 are raised along the lamination direction Z. On the other hand, the second coupling pin 154 is lowered along the lamination direction Z. As a result, the second connecting plate 156, the second cylinder 158, and the second holding member 146 of the separator bonding unit 140 are lowered along the lamination direction Z. In this manner, when the servo motor 151 is rotated in the clockwise direction illustrated in FIG. 8A, the ultrasonic horn 141 and the anvil 145 are separated from each other. On the other hand, when the servo motor 151 is rotated in the counterclockwise direction illustrated in FIGS. 8A and 8B), the ultrasonic horn 141 and the anvil 145 approach each other.

The bagged electrode conveyance unit 160, illustrated in FIGS. 5, 6A and 6B, conveys the bagged electrode 11 that is formed by the separator bonding unit 140.

The bagged electrode conveyance unit 160 is adjacent to the electrode conveyance unit 110 along the transport direction X, and is disposed on the downstream side of the first separator conveyance unit 120 and the second separator conveyance unit 130 in the transport direction X. The conveyor belt 161 is for transporting the bagged electrode 11. The conveyor belt 161 comprises an endless belt provided with a plurality of suction openings on the outer perimeter surface, and transports the bagged electrode 11 under a suctioned state along the transport direction X. The width of the conveyor belt 161 along the intersecting direction Y, which intersects the transport direction X, is formed smaller than the width of the bagged electrode 11. That is, the two sides of the bagged electrode 11 protrude outwardly from the conveyor belt 161, with respect to the intersecting direction Y. In this manner, the conveyor belt 161 avoids interference with the separator bonding unit 140. The rotating roller 162 is for rotating the conveyor belt 161. A plurality of rotating rollers 162 are arranged on the inner perimeter surface of the conveyor belt 161 along the intersecting direction Y. The rotating roller 162 does not protrude from the conveyor belt 161 in order to avoid interference with the separator bonding unit 140. Of the plurality of rotating rollers 162, one is a drive roller provided with power, and the others are driven rollers which are driven by the drive roller.

The suction pad 163 of the bagged electrode conveyance unit 160 is for suctioning the bagged electrode 11. The suction pad 163 is positioned so as to oppose the bagged electrode 11 in the lamination direction Z of FIG. 5, above the bagged electrode 11, which is mounted on the conveyor belt 161. The suction pad 163 has a plate shape, and is provided with a plurality of suction openings on the surface that abuts the bagged electrode 11. The elastic member 164 is for moving the suction pad 163 up and down along the lamination direction Z. One end of the elastic member 164 is bonded to the suction pad and the other end is anchored to the X-axis stage 165 and the X-axis auxiliary rail 166. The elastic member 164 can be freely extended along the lamination direction Z, powered by an air compressor or the like. The X-axis stage 165 and the X-axis auxiliary rail 166 are for moving the elastic member 164 that is bonded to the suction pad 163 along the transport direction X. The x-axis stage 165 is disposed along the transport direction X, and moves the elastic member 164 along the transport direction X. The X-axis auxiliary rail 166 is disposed parallel to the X-axis stage 165, and assists the scanning of the elastic member 164 by the x-axis stage 165. The mounting table 167 temporarily mounts and stores the bagged electrodes 11. The mounting table 167 has a plate shape, and is disposed further on the downstream side than the conveyor belt 161 along the transport direction X.

The control unit 170, illustrated in FIG. 5, controls the respective operations of the electrode conveyance unit 110, the first separator conveyance unit 120, the second separator conveyance unit 130, the separator bonding unit 140, the separate/approach unit 150, and the bagged electrode conveyance unit 160.

The controller 171 of the control unit 170 corresponds to a control member, and controls the ultrasonic bonding device 100. The controller 171 comprises a ROM, a CPU, and a RAM. The ROM (Read Only Memory) stores a control program relating to the ultrasonic bonding device 100. The control program includes those related to the control of the rotating roller 114 and the cutting blades 115 and 116 of the electrode conveyance unit 110, the first conveyance drum 124 and the first cutting blade 125 of the first separator conveyance unit 120, and the second conveyance drum 134 and the second cutting blade 135 of the second separator conveyance unit 130. Furthermore, the control program includes those related to the controls of the oscillator 143 of the separator bonding unit 140, the servo motor 151 of the separate/approach unit 150, and the rotating roller 162, the suction pad 163, the elastic member 164, and the X-axis stage 165 of the bagged electrode conveyance unit 160. The CPU (Central Processing Unit) controls the operation of each component member of the ultrasonic bonding device 100 based on the control program. The RAM (Random Access Memory) temporarily stores various data relating to each component member of the ultrasonic bonding device 100 being controlled. For example, the data are cumulative values of the forward and reverse rotational speeds of the servo motor 151 of the separate/approach unit 150.

Next, the operation of the ultrasonic bonding device 100 will be described with reference to FIG. 9 in addition to FIGS. 5 to 8B.

Figure 9:
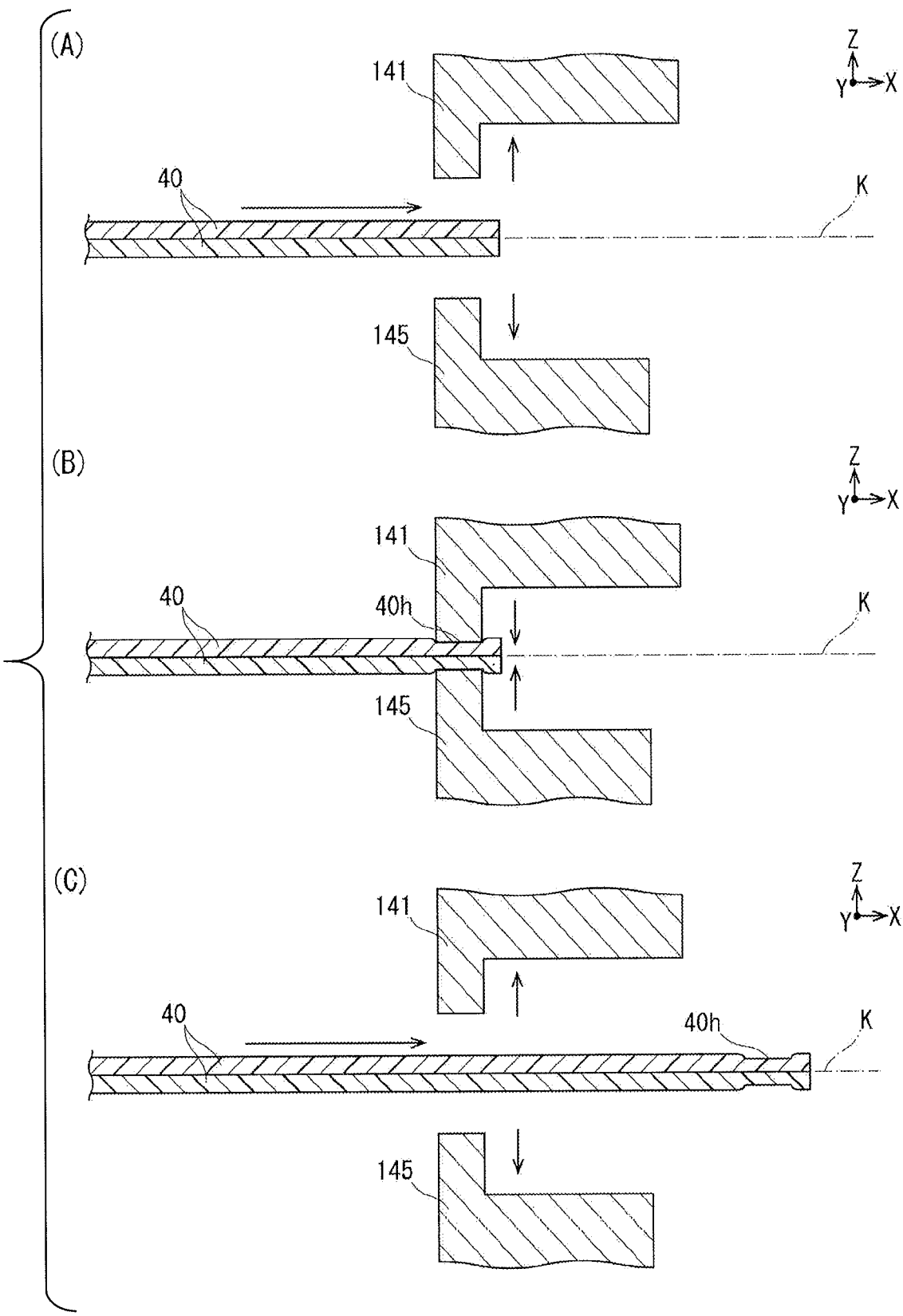
FIG. 9 is a series of partial cross-sectional views schematically illustrating a state in which a pair of separators are bonded to each other by the ultrasonic bonding device of FIG. 5.

FIG. 9 shows partial cross-sectional views schematically illustrating a state in which a pair of separators 40 are bonded to each other by the ultrasonic bonding device 100 of FIG. 5.

The electrode conveyance unit 110 cuts the elongated positive electrode substrate 20A one by one into a predetermined shape to form positive electrodes 20 with the cutting blades 115 and 116, as illustrated in FIG. 5. The electrode conveyance unit 110 transports the positive electrode 20 between the first separator conveyance unit 120 and the second separator conveyance unit 130.

Next, the first separator conveyance unit 120 cuts out and transports a separator 40 for laminating on one surface of the positive electrode 20 from the separator substrate 40A, as illustrated in FIGS. 5, 6A and 6B. The first cutting blade 125 is for cutting the elongated separator substrate 40A one by one to form separators 40. The first separator conveyance unit 120 laminates the separator 40 on one surface (the back surface side, downward along the lamination direction Z in FIG. 5) side of the positive electrode 20 that is transported from the electrode conveyance unit 110.

In the same manner, the second separator conveyance unit 130 cuts out and transports a separator 40 for laminating on the other surface opposing the one surface of the positive electrode 20 from the separator substrate 40A, in conjunction with the operation of the first separator conveyance unit 120, as illustrated in FIGS. 5, 6A and 6B. The second cutting blade 135 is for cutting the elongated separator substrate 40A one by one to form separators 40. The second separator conveyance unit 130 laminates the separator 40 on the other surface (the front surface side, upward along the lamination direction Z in FIG. 5) side of the positive electrode 20 that is transported from the electrode conveyance unit 110.

Next, the separator bonding unit 140, etc., bonds a pair of separators 40 to each other, which are laminated so as to sandwich the positive electrode 20, as illustrated in FIG. 5 to FIG. 9. Specifically, the ultrasonic horn 141 and the anvil 145 are respectively separated from each other, and from the transport path K of the pair of separators 40 by the separate/approach unit 150, and the pair of separators 40 are moved along the transport path K by the first separator conveyance unit 120 and the second separator conveyance unit 130, as illustrated in view A of FIG. 9, etc. The pair of separators 40 are moved along the transport path K while the ultrasonic horn 141 and the anvil 145 are separating from each other from the transport path K, or after being separated from each other from the transport path K. In this manner, the bonding portion 40*h* of the pair of separators 40 is positioned between the ultrasonic horn 141 and the anvil 145.

In addition, the separator bonding unit 140 and the separate/approach unit 150 bond the pair of separators 40 while sandwiching the same with the ultrasonic horn 141 and the anvil 145, as illustrated in view B of FIG. 9.

Furthermore, the ultrasonic horn 141 and the anvil 145 are respectively separated from each other, from the transport path K of the pair of separators 40 by the separate/approach unit 150, and the pair of separators 40 are moved along the transport path K by the first separator conveyance unit 120 and the second separator conveyance unit 130, as illustrated in view C of FIG. 9, etc. In this manner, the next bonding portion 40h of the pair of separators 40 is positioned between the ultrasonic horn 141 and the anvil 145.

Thereafter, the bagged electrode conveyance unit 160, illustrated in FIGS. 5, 6A and 6B, conveys the bagged electrode 11 that is formed by the separator bonding unit 140. The bagged electrode conveyance unit 160 temporarily mounts and stores the bagged electrode 11 on the mounting table 167.

According to the first embodiment described above, the action and effects are achieved by the following configurations.

The ultrasonic bonding device 100 comprises a processing member (ultrasonic horn 141), a biasing member (anvil 145), a first moving unit (separate/approach unit 150), and a second moving unit (first separator conveyance unit 120 and second separator conveyance unit 130). The ultrasonic horn 141 bonds members to be bonded (the pair of separators 40) by applying ultrasonic waves thereto. The anvil 145 faces the ultrasonic horn 141 via the pair of separators 40, and biases the pair of separators 40 to the ultrasonic horn 141. The separate/approach unit 150 respectively causes the ultrasonic horn 141 and the anvil 145 to separate from and approach each other with respect to the transport path K of the pair of separators 40. The first separator conveyance unit 120 unit and the second separator conveyance unit 130 move a pair of separators 40 along the transport path K, in a state in which the ultrasonic horn 141 and the anvil 145 are separated from the transport path K, and position the bonding portion 40h of the pair of separators 40 between the ultrasonic horn 141 and the anvil 145. The separate/approach unit 150 comprises a coupling cam that is rotationally driven by a driving unit, a first connecting portion that couples the coupling cam and the processing member, and a second connecting portion that couples the coupling cam and the biasing member, and causes the processing member and the biasing member to separate from and approach each other by the rotational driving of the coupling cam.

The ultrasonic bonding method comprises a moving step and a bonding step. In the moving step, the bonding portion 40h of the pair of separators 40 is moved between the ultrasonic horn 141 and the anvil 145, in a state in which a processing member (ultrasonic horn 141) that applies ultrasonic waves to members to be bonded (the pair of separators 40), and a biasing member (anvil 145) that biases the ultrasonic horn 141 via the pair of separators 40, are respectively separated from each other, and from the transport path K of the pair of separators 40. In the bonding step, the pair of separators 40 are bonded while being sandwiched by the ultrasonic horn 141 and the anvil 145.

According to such a configuration, when moving the pair of separators 40, the ultrasonic horn 141 and the anvil 145 are respectively separated from the transport path K. That is, it is possible to move the pair of separators 40 along the transport path K, without interfering with the anvil 145 in addition to the ultrasonic horn 141. Therefore, with this ultrasonic bonding device and ultrasonic bonding method, it is possible to move a pair of separators 40 along a transport path K and bonding the same, while avoiding physical interference.

Furthermore, particularly in the ultrasonic bonding device 100, the separate/approach unit 150 can be telescopically configured along a direction that intersects the transport path K, comprising a first pressing member (first cylinder 157) that presses the ultrasonic horn 141 to the pair of separators 40.

According to such a configuration, even when the outer shape of the ultrasonic horn 141 is deformed, a gap will not be generated between the ultrasonic horn 141 and the separator 40, and the pressing force will not be reduced. Therefore, it is possible to sufficiently press the ultrasonic horn 141 to the pair of separators 40 by the first cylinder 157. The deformation of the ultrasonic horn 141 corresponds to, for example, the wear on the contact surfaces caused by the application of ultrasonic waves.

In addition, according to such a configuration, even if the position of the ultrasonic horn 141 is displaced, it is possible to sufficiently press the ultrasonic horn 141 to the pair of separators 40 by the first cylinder 157, without being influenced thereby. The positional displacement of the ultrasonic horn 141 corresponds to, for example, a relative positional displacement caused by the vibration of the ultrasonic waves and the pressing against the pair of separators 40.

In addition, according to such a configuration, even if the thickness of the pair of separators 40 with which the ultrasonic horn 141 comes into contact fluctuates, it is possible to sufficiently press the ultrasonic horn 141 to the pair of separators 40 by the first cylinder 157, without being influenced thereby. The fluctuation in the thickness of the pair of separators corresponds to variations in thickness between lots, and errors in the thickness in the same lot.

In addition, according to such a configuration, it is possible to control the pressing force by the ultrasonic horn 141 against the pair of separators 40 to be constant, by the first cylinder 157. Therefore, it is possible to maintain the state of the ultrasonic bonding constant, and to improve the reliability relating to ultrasonic bonding, In addition, according to such a configuration, it is possible to freely adjust the distance between the ultrasonic horn 141 and the transport path K along the lamination direction Z, by the first cylinder 157. Therefore, it is possible to sufficiently prevent interference by increasing the distance between the ultrasonic horn 141 and the transport path K, or to shorten the time relating to movement by shortening the distance between the ultrasonic horn 141 and the transport path K, according to the thickness and the deformed state of the members to be bonded.

Furthermore, particularly in the ultrasonic bonding device 100, the separate/approach unit 150 can be telescopically configured along a direction that intersects the transport path K, comprising a second pressing member (second cylinder 158) that presses the anvil 145 to the pair of separators 40.

According to such a configuration, even when the outer shape of the anvil 145 is deformed, a gap will not be generated between the anvil 145 and the separator 40, and the pressing force will not be reduced. Therefore, it is possible to sufficiently press the anvil 145 to the pair of separators 40 by the second cylinder 158. The deformation of the anvil 145 corresponds to, for example, the wear caused by the application of ultrasonic waves from the ultrasonic horn 141 via the pair of separators 40.

In addition, according to such a configuration, even if the position of the anvil 145 is displaced, it is possible to sufficiently press the anvil 145 to the pair of separators 40 by the second cylinder 158, without being influenced thereby. The positional displacement of the anvil 145 corresponds to, for example, a relative positional displacement caused by the vibration of the ultrasonic waves from the ultrasonic horn 141 via the pair of separators 40 and the pressing against the pair of separators 40.

In addition, according to such a configuration, even if the thickness of the pair of separators 40 with which the anvil 145 comes into contact fluctuates, it is possible to sufficiently press the anvil 145 to the pair of separators 40 by the second cylinder 158, without being influenced thereby.

In addition, according to such a configuration, it is possible to control the pressing force by the anvil 145 against the pair of separators 40 to be constant, by the second cylinder 158. Therefore, it is possible to maintain the state of the ultrasonic bonding constant, and to improve the reliability relating to ultrasonic bonding, In addition, according to such a configuration, it is possible to freely adjust the distance between the anvil 145 and the transport path K along the lamination direction Z, by the second cylinder 158. Therefore, it is possible to sufficiently prevent interference by increasing the distance between the anvil 145 and the transport path K, or to shorten the time relating to movement by shortening the distance between the anvil 145 and the transport path K, according to the thickness and the deformed state of the members to be bonded.

Furthermore, particularly in the ultrasonic bonding device 100, the separate/approach unit 150 can be configured to comprise a rotation unit (servo motor 151 and coupling cam 152), a first supporting part (first coupling pin 153 and first connecting plate 155), and a second supporting part (second coupling pin 154 and second connecting plate 156). The rotation unit (servo motor 151 and coupling cam 152) freely rotates forward and in reverse. The first supporting part (first coupling pin 153 and first connecting plate 155) is engaged with the rotation unit (servo motor 151 and coupling cam 152) and supports the ultrasonic horn 141. The second supporting part (second coupling pin 154 and second connecting plate 156) is engaged with the rotation unit (servo motor 151 and coupling cam 152) and supports the anvil 145. Here, the rotation unit (servo motor 151 and coupling cam 152) causes the ultrasonic horn 141 and the anvil 145 to separate from or approach each other by the movement of a forward rotation or a reverse rotation.

According to such a configuration, it is possible to cause the ultrasonic horn 141 and the anvil 145 to separate from or approach each other by the very simple configuration of the rotation unit (servo motor 151 and coupling cam 152), the first supporting part (first coupling pin 153 and first connecting plate 155), and the second supporting part (second coupling pin 154 and second connecting plate 156). In particular, it is possible to operate the first supporting part (first coupling pin 153 and first connecting plate 155) and the second supporting part (second coupling pin 154 and second connecting plate 156) only by one rotation unit (servo motor 151 and coupling cam 152). Therefore, the cost required for manufacturing the ultrasonic bonding device 100 can be reduced. Furthermore, the electric power required for the operation of the ultrasonic bonding device 100 can be reduced. Furthermore, the ultrasonic bonding device 100 can be miniaturized.

In addition, according to such a configuration, since the ultrasonic horn 141 and the anvil 145 are caused to separate from or approach each other by the same rotation unit (servo motor 151 and coupling cam 152), it is easy to synchronize the movements of the ultrasonic horn 141 and the anvil 145. That is, it is possible to reliably cause the ultrasonic horn 141 and the anvil 145 to separate from or approach each other. Therefore, it is possible to improve the reliability relating to the ultrasonic bonding of the ultrasonic bonding device 100.

In addition, according to such a configuration, since the ultrasonic horn 141 and the anvil 145 are operated by the same rotation unit (servo motor 151 and coupling cam 152), it is possible to prevent the ultrasonic bonding from being continued in a an insufficient state in which only the operation of the ultrasonic horn 141 is normal, or in which only the operation of the anvil 145 is normal. Therefore, it is possible to improve the reliability relating to the ultrasonic bonding of the ultrasonic bonding device 100.

In addition, particularly in the ultrasonic bonding method, the moving step can be configured to transport a pair of thin plate-shaped separators 40.

According to such a configuration, it is possible to prevent interference between the ultrasonic horn 141 and the anvil 145, even if the pair of separators 40 are formed in a thin plate shape that is difficult to maintain constant, and must be transported in a state in which deformation is allowed. Therefore, even a pair of separators 40 that are formed in a thin plate shape can be stably moved along the transport path K without interference. It is particularly favorable when the pair of separators 40 will be considerably deformed so as to sag by transporting the pair of separators 40 at a high speed.

In addition, according to such a configuration, even if, for example in the ultrasonic bonding method, there is the possibility that the pair of separators 40 will be deformed due to external air flow or internal vibration, etc., it is possible to prevent interference between the ultrasonic horn 141 and the anvil 145, without being influenced by such disturbances.

In addition, according to such a configuration, for example in the ultrasonic bonding device 100, if deformation of the pair of separators 40 can be allowed when transporting the pair of separators 40, the configuration relating to transportation can be simplified compared to a case in which the deformation cannot be allowed.

In particular, in such a configuration, since a pair of separators 40 that are difficult to maintain their shapes are used, it is desirable to avoid a method in which, for example, the pair of separators 40 themselves are made eccentric from the transport path K along the lamination direction Z and moved to pass through the middle of the ultrasonic horn 141 and the anvil 145, but to employ a method in which the pair of separators 40 are moved along the transport path K.

Furthermore, particularly in the ultrasonic bonding method, the moving step may be configured such that the pair of separators 40 are moved between the ultrasonic horn 141 and the anvil 145 in a state in which the pair of separators 40 are arranged horizontally.

According to such a configuration, even if the pair of separators 40 that are arranged horizontally must be transported in a state in which sagging can easily occur due to gravity, it is possible to prevent interference with, for example, the anvil 145, which is disposed below in the direction of gravity (lamination direction Z). Therefore, even a pair of separators 40 that are arranged horizontally can be stably moved along the transport path K without interference.

Second Embodiment

An ultrasonic bonding device 200 that embodies the method of bonding members to be bonded (separators 40) according to a second embodiment will be described, with reference to FIGS. 10A and 10B.

The ultrasonic bonding device 200 according to the second embodiment is different from the ultrasonic bonding device 100 according to the first embodiment described above, in the configuration in which the two sides of the pair of separators 40 along the transport direction X are subjected to seam welding. In the ultrasonic bonding device 100 described above, the two sides of the pair of separators 40 are spot welded.

In the second embodiment, the same codes are used for configurations that are the same as the first embodiment described above, and the descriptions thereof are omitted.

The configuration and the operation of the ultrasonic bonding device 200 that embodies the method of bonding members to be bonded (separators 40) will be described in order, with reference to FIGS. 10A and 10B.

Figure 10A:
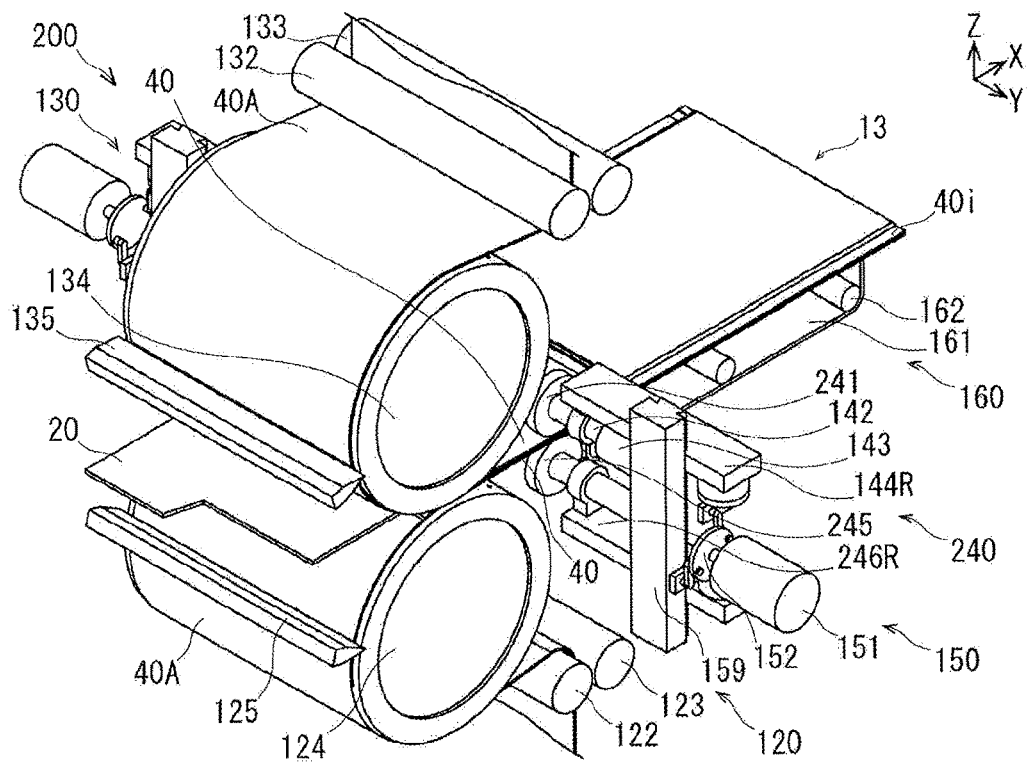
FIGS. 10A and 10B are perspective views illustrating the principle parts of the ultrasonic bonding device of the members to be bonded according to a second embodiment.
Figure 10B:
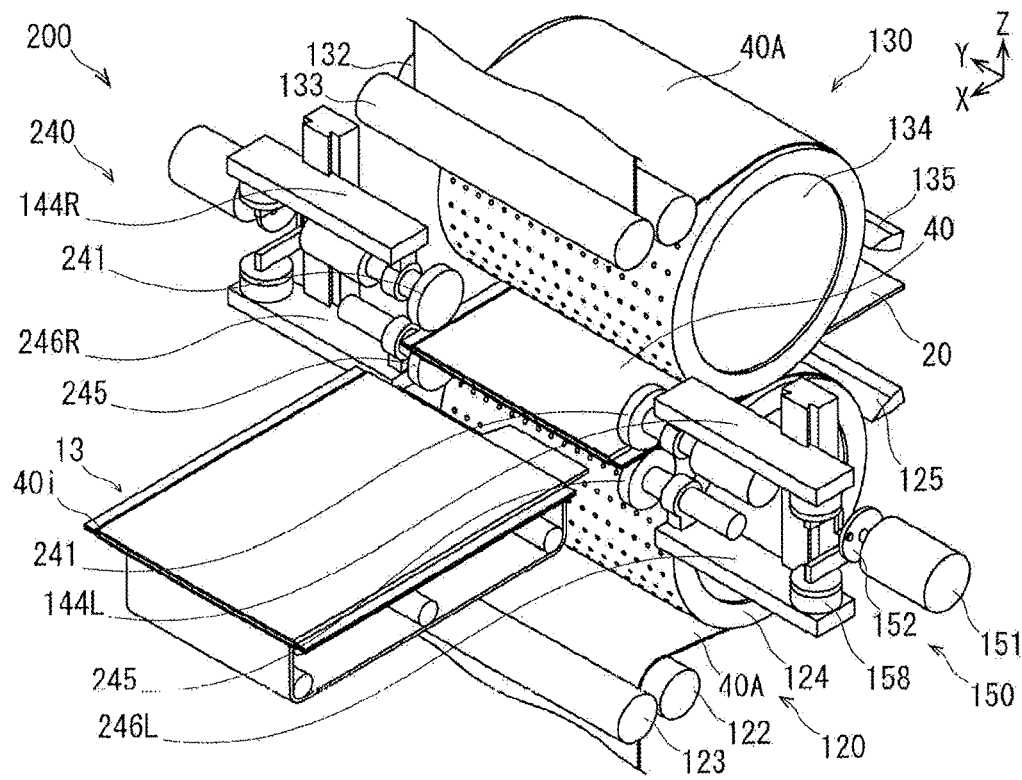

FIGS. 10A and 10B are perspective views illustrating the principle parts of the ultrasonic bonding device 200.

The separator bonding unit 240 and the separate/approach unit 150 continuously bond the two sides of a pair of separators 40 along the transport direction X to form a bagged electrode 13 comprising a linear bonding portion 40*i*. The separator bonding unit 240 and the separate/approach unit 150 are disposed on the downstream side of the first separator conveyance unit 120 and the second separator conveyance unit 130 in the transport direction X, one set each at the two sides along the transport direction X. That is, unlike the above-described separator bonding unit 140, in the separator bonding unit 240 and the separate/approach unit 150, each component material is disposed along the intersecting direction Y which intersects the transport direction X. Compared to the separator bonding unit 140, the separator bonding unit 240 differs in the configurations of the ultrasonic horn 241, the anvil 245, and the second holding member 246.

The ultrasonic horn 241 of the separator bonding unit 240 is for applying ultrasonic waves to the separator 40. The ultrasonic horn 241 is made of metal and formed in a disk shape. The ultrasonic horn 241 is rotatably disposed along the transport path K of the pair of separators 40. The ultrasonic horn 241, while being rotated, presses the pair of separators 40 and applies ultrasonic waves thereto, to thereby bond by welding the pair of separators 40 to each other by heating.

The anvil 245 of the separator bonding unit 240 is for biasing the pair of separators 40 to the ultrasonic horn 241. The anvil 245 is opposed to the ultrasonic horn 241 across the pair of separators 40. The anvil 245 is made of metal and formed in a disk shape. The anvil 245 is rotatably disposed along the transport path K of the pair of separators 40. The anvil 245 biases the ultrasonic horn 241 while being rotated. The second holding member 246 is for holding the anvil 245. One end of the second holding member 246 is formed in an annular shape, and the rotational shaft of the anvil 245 is inserted therethrough.

According to the second embodiment described above, the action and effects are achieved by the following configurations.

In the ultrasonic bonding device 200, the ultrasonic horn 241 is formed in a disk shape that is rotatable along the transport path K, and continuously applies ultrasonic waves to the pair of separators 40. In addition, the anvil 245 is formed in a disk shape that is rotatable along the transport path K, and continuously biases the pair of separators 40 to the ultrasonic horn 241.

In this manner, a configuration in which the pair of separators 40 are moved along the transport path K without interfering the ultrasonic horn 241 and the anvil 245 can be applied to a mode in which a linear bonding portion 40*i* is formed by continuously bonding the two sides of the pair of separators 40 along the transport direction X by so-called seam welding.

According to such a configuration, it is possible to more firmly bond the two sides of the pair of separators 40 by seam welding. In addition, according to such a configuration, since the ultrasonic horn 241 and the anvil 245 carry out welding by abutting the two side portions of the pair of separators 40 while being rotated, the ultrasonic horn and the anvil are not easily adhered to the separators 40. Therefore, it is possible to prevent the ultrasonic horn 241 and the anvil 245 from being moved in a state of being attached to the separators 40, preventing the separators 40 from being damaged. In addition, according to such a configuration, it is possible to transport and bond the pair of separators 40, in a state of continuing rotations of the first conveyance drum 124 and the second conveyance drum 134, by rotatably abutting the ultrasonic horn 241 and the anvil 245 to the separators 40.

Other than the foregoing, various modifications to the present invention based on the configurations described in the claims are possible, which also belong in the scope of the present invention.

For example, in the first and second embodiments, configurations were described in which, in a bagged electrode 11 that configures a lithium ion secondary battery 1, a pair of separators 40 that are used in the bagged electrode 11 are bonded to each other, but no limitation is imposed thereby. The invention may be applied to bonding members to be bonded other than the bagged electrode 11 that is used in a bagged electrode 11 that configures a lithium ion secondary battery 1.

In addition, in the first and second embodiments, the secondary battery was described as having a lithium ion secondary battery 1 configuration, but no limitation is imposed thereby. The secondary battery may be configured as, for example, a polymer lithium battery, a nickel-hydrogen battery, or a nickel-cadmium battery.

Additionally, a configuration was described in the first and the second embodiments in which the bagged electrode 11 is formed by bagging a positive electrode 20 with a pair of separators 40, but the invention is not limited to such a configuration. The bagged electrode may be configured to be formed by bagging a negative electrode 30 with a pair of separators 40. In addition, the bagged electrode may be configured to be formed by inserting a positive electrode 20 or a negative electrode 30 after bonding a pair of separators 40 to each other.

Furthermore, in the first embodiment, a configuration was described in which two ends of a pair of separators 40 are spot welded using an ultrasonic horn 141 and an anvil 145, but the invention is not limited to such a configuration. The invention may be configured to form a seam welding at the two ends of a pair of separators 40 by continuously forming a bonding portion.

Additionally, in the first embodiment, a configuration was described in which a pair of separators 40 are sandwiched while ultrasonic waves are applied thereto by an anvil 145 and only one rectangular protrusion 141*b* that is provided with respect to the ultrasonic horn 141, but the invention is not limited to such a configuration. The ultrasonic horn 141 may be configured to comprise, for example, a plurality of protrusions in a matrix. In addition, the ultrasonic horn 141 may be configured to comprise, for example, a protrusion that is curved or having a sharpened tip.

Furthermore, in the second embodiment, a configuration was described in which two sides of a pair of separators 40 are subjected to seam welding using a disk-shaped ultrasonic horn 241 and a disk-shaped anvil 245, but the invention is not limited to such a configuration. The invention may be configured such that the two sides of a pair of separators 40 are spot welded by separating a disk-shaped ultrasonic horn 241 and anvil 245 from the pair of separators 40 at regular intervals. In such a configuration, it is possible to bond the two sides of a pair of separators 40 that are being transported while continuing the rotations of the first conveyance drum 124 and the second conveyance drum 134.

In addition, in the first and the second embodiments, the first moving unit that is configured from a rotation unit, a first supporting part, and a second supporting part, may be realized by the so-called rack and pinion configuration.

The invention claimed is:

1. An ultrasonic bonding device comprising:
    a processing member that bonds members to be bonded by applying ultrasonic waves thereto;
    a biasing member oppositely disposed from the processing member across the members to be bonded, and that biases the members to be bonded towards the processing member;
    a first moving unit that separates each of the processing member and the biasing member from each other and that approaches each other with respect to a transport path of the members to be bonded; and
    a second moving unit that moves the members to be bonded along the transport path in a state in which the processing member and the biasing member are separated from the transport path, and that positions the bonding portion of the members to be bonded between the processing member and the biasing member, wherein
    the first moving unit comprises a coupling cam rotationally driven by a driving unit, a first connecting portion that couples the coupling cam and the processing member, and a second connecting portion that couples the coupling cam and the biasing member, and that causes the processing member and the biasing member to separate from and approach each other with respect to the transport path by the rotation of the coupling cam,
    the first moving unit comprises at least one of a first pressing member that controls the pressing force of the processing member against the members to be bonded to be constant, and a second pressing member that controls the pressing force of the biasing member against the members to be bonded to be constant.

2. The ultrasonic bonding device according to claim 1, wherein
    the first pressing member is telescopically configured along a direction that intersects the transport path to press the processing member towards the members to be bonded.

3. The ultrasonic bonding device according to claim 1, wherein
    the second pressing member is telescopically configured along a direction that intersects the transport path to press the biasing member towards the members to be bonded.

4. The ultrasonic bonding device according to claim 1, wherein
    the first moving unit further comprises:
        a rotation unit that is freely rotated in a forward rotation and a reverse rotation;
        a first supporting part engaged with the rotating member and supporting the processing member; and
        a second supporting part engaged with the rotating member and supporting the biasing member, wherein
    the rotation unit causes the processing member and the biasing member to separate from or approach each other by the movement of a forward rotation or a reverse rotation.

5. The ultrasonic bonding device according to claim 1, wherein
    the processing member is disk shaped, and configured to rotate along the transport path and continuously apply ultrasonic waves to the members to be bonded; and
    the biasing member is disk shaped, and configured to rotate along the transport path, and continuously bias the members to be bonded towards the processing member.

6. The ultrasonic bonding device according to claim 2, wherein
    the second pressing member is telescopically configured along a direction that intersects the transport path to press the biasing member towards the members to be bonded.

7. The ultrasonic bonding device according to claim 2, wherein
    the first moving unit further comprises:
        a rotation unit that is freely rotated in a forward rotation and a reverse rotation;
        a first supporting part engaged with the rotating member and supporting the processing member; and
        a second supporting part engaged with the rotating member and supporting the biasing member, wherein
    the rotation unit causes the processing member and the biasing member to separate from or approach each other by the movement of a forward rotation or a reverse rotation.

8. The ultrasonic bonding device according to claim 2, wherein
    the processing member is disk shaped, and configured to rotate along the transport path and continuously apply ultrasonic waves to the members to be bonded; and
    the biasing member is disk shaped, and configured to rotate along the transport path, and continuously bias the members to be bonded towards the processing member.

9. The ultrasonic bonding device according to claim 3, wherein
    the first moving unit further comprises:
        a rotation unit that is freely rotated in a forward rotation and a reverse rotation;
        a first supporting part engaged with the rotating member and supporting the processing member; and
        a second supporting part engaged with the rotating member and supporting the biasing member, wherein
    the rotation unit causes the processing member and the biasing member to separate from or approach each other by the movement of a forward rotation or a reverse rotation.

10. The ultrasonic bonding device according to claim 3, wherein
    the processing member is disk shaped, and configured to rotate along the transport path and continuously apply ultrasonic waves to the members to be bonded; and the biasing member is disk shaped, and configured to rotate along the transport path, and continuously bias the members to be bonded towards the processing member.

11. The ultrasonic bonding device according to claim 4, wherein the processing member is disk shaped, and configured to rotate along the transport path and continuously apply ultrasonic waves to the members to be bonded; and the biasing member is disk shaped, and configured to rotate along the transport path, and continuously bias the members to be bonded towards the processing member.

\* \* \* \* \*